(12) United States Patent
Sugimoto

(10) Patent No.: US 7,880,907 B2
(45) Date of Patent: Feb. 1, 2011

(54) PRINTING SYSTEM, IMAGE READING DEVICE AND CONTROL METHOD THEREOF

(75) Inventor: Hideaki Sugimoto, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1041 days.

(21) Appl. No.: 11/244,058

(22) Filed: Oct. 6, 2005

(65) Prior Publication Data

US 2006/0285127 A1  Dec. 21, 2006

(30) Foreign Application Priority Data

Jun. 21, 2005 (JP) .............................. 2005-180754

(51) Int. Cl.
G06K 15/00 (2006.01)
G06F 3/12 (2006.01)
H04N 1/36 (2006.01)

(52) U.S. Cl. .................... 358/1.14; 358/1.15; 358/1.16; 358/412; 358/413

(58) Field of Classification Search ....... 358/1.14–1.16, 358/437, 412, 413
See application file for complete search history.

(56) References Cited

U.S. PATENT DOCUMENTS

| | | | | |
|---|---|---|---|---|
| 4,797,706 A * | 1/1989 | Sugishima et al. | ........... | 358/300 |
| 5,768,483 A * | 6/1998 | Maniwa et al. | ............. | 358/1.15 |
| 5,812,747 A * | 9/1998 | Kayano et al. | ............. | 358/1.15 |
| 5,881,168 A * | 3/1999 | Takaoka et al. | ............. | 382/180 |
| 6,078,759 A * | 6/2000 | Satake et al. | .................... | 399/8 |
| 6,081,342 A * | 6/2000 | Nakai et al. | ................. | 358/1.16 |
| 6,351,315 B2 * | 2/2002 | Kusumoto | ................. | 358/1.14 |
| 6,813,038 B1 * | 11/2004 | Kadowaki | ................... | 358/1.18 |
| 7,167,256 B1 * | 1/2007 | Koike et al. | ................. | 358/1.15 |
| 7,289,239 B2 * | 10/2007 | Kadowaki | ................... | 358/1.18 |
| 7,420,695 B2 * | 9/2008 | Kawabata et al. | .......... | 358/1.15 |
| 7,589,848 B2 * | 9/2009 | Kadowaki | ................... | 358/1.13 |
| 2002/0051182 A1 * | 5/2002 | Sommer et al. | ............ | 358/1.15 |

(Continued)

FOREIGN PATENT DOCUMENTS

JP  A 09-238209  9/1997

(Continued)

OTHER PUBLICATIONS

Jan. 12, 2010 Office Action issued in Japanese Patent Application No. 2005-180754 (with translation).

Primary Examiner—Twyler L Haskins
Assistant Examiner—Jonathan R Beckley
(74) Attorney, Agent, or Firm—Oliff & Berridge, PLC

(57) ABSTRACT

A printing system including a printing device which has a cancel instruction unit that instructs cancellation of a current job being processed from an operation panel, and an image reading device that describes original image data read from an original in a page description language and sends to the printing device, in which the image reading device describes the read original image data in the page description language and sends it as a copy job to the printing device, obtains a job holding state from the printing device and reserves at least the transmission of the copy job to the printing device until the job held by the printing device runs out when it is judged according to the obtained job holding information that the printing device is in a job holding state.

6 Claims, 11 Drawing Sheets

U.S. PATENT DOCUMENTS

2002/0051195 A1* 5/2002 Arakawa .................. 358/1.15
2004/0099166 A1* 5/2004 Blom et al. ................. 101/483

FOREIGN PATENT DOCUMENTS

| JP | A 2001-282476 | 10/2001 |
| JP | A 2002-123376 | 4/2002 |
| JP | A 2005-124073 | 5/2005 |

* cited by examiner

PRINTING SYSTEM, IMAGE READING DEVICE AND CONTROL METHOD THEREOF

BACKGROUND OF THE INVENTION

1. Field of the Invention

The present invention relates to a printing system, an image reading device and a control method thereof, and more particularly to a printing system, an image reading device and a control method thereof configured to reserve at least transmission of a copy job from an image reading device side until jobs held by a printing device run out.

2. Description of the Related Art

In recent years, OA (Office Automation) equipment such as copy machines and multifunctional devices are becoming available at a lower cost, and hardware manufacturers providing users with such OA equipment are required to take measures against it.

Therefore, there is proposed a scanner and printer system (printing system) which realizes print processing such as copy processing or the like with a scanner and a printer used in cooperation with each other.

The above printing system has advantages that print processing such as copy processing and the like can be realized by a simple structure and its introduction cost can be made considerably lower than that incurred when a multifunctional device or a copy machine is introduced.

In this type of printing system, where print processing is performed by cooperation between the scanner and the printer, the scanner side sends a copy job regardless of a job holding state by the printer side, and the printer stores the received copy job in the same job queue as the print job (a job from a host terminal or the like other than the scanner). Therefore, when the printer side receives the copy job from the scanner side during its print job processing, the received copy job is stored to be next to the preceding print job and set in a printing queue.

As a technology which enables to perform a user operation on a print job stored in a job queue of this printer, there is a known technology described in, for example, Japanese Patent Application Laid-Open No. 2001-282476. According to the technology of this Japanese Patent Application Laid-Open No. 2001-282476, print jobs being spooled in the printer are listed and shown on a display of a host terminal connected to the printer, and a job desired to be printed can be designated from the list.

But, it is generally conducted to give an instruction from the host terminal to the printer for cancellation or the like of a print job being spooled, but the print job (being spooled) stored in the job queue could not be selected to cancel from the printer.

Specifically, according the specifications of most of the printers available on the current market, where an instruction to cancel a print job being stored in the job queue was given from the operation panel, the job to be cancelled was limited to the current job being processed.

On the other hand, a job being performed on the scanner side or waiting to be transmitted could be instructed for cancellation immediately from the operation panel of the scanner.

Therefore, if an original was erroneously started to be scanned on the scanner side while a print job was being performed on the printer side, its cancellation could be instructed immediately when the copy job had not been transmitted yet, but if the copy job had been sent to the printer side, the job was not performed as a current job on the printer side, so that its cancellation could not be instructed immediately from the operation panel of the printer.

Even if it could be made, it is necessary to wait until the print job being processed is completed and the copy job becomes a current job, and there is a possibility of an operation error to cancel a different print job in error.

SUMMARY OF THE INVENTION

The present invention has been made in view of the above circumstances and provides a printing system, an image reading device and a control method thereof that cancellation processing of a job from an image reading device can be made immediately and securely while utilizing the specifications of existing printing devices.

An aspect of the present invention provides a printing system including a printing device which has a cancel instruction unit that instructs cancellation of a current job being processed from an operation panel, and an image reading device that describes original image data read from an original in a page description language and sends to the printing device, wherein the image reading device comprises: an acquisition unit that obtains job holding information indicating a job holding state from the printing device; a control unit that reads original image data from the original, describes the read original image data in the page description language and sends it as a copy job to the printing device; and a reserve control unit that reserves at least the transmission of the copy job to the printing device until the job held by the printing device runs out when it is judged according to the job holding information obtained by the acquisition unit that the printing device is in a job holding state.

BRIEF DESCRIPTION OF THE DRAWINGS

Embodiments of the present invention will be described in detail based on the following figures, wherein.

DETAILED DESCRIPTION OF THE INVENTION

Embodiments of a printing system, an image reading device and a control method thereof according to the present invention will be described in detail with reference to the accompanying figures.

Figure 1:
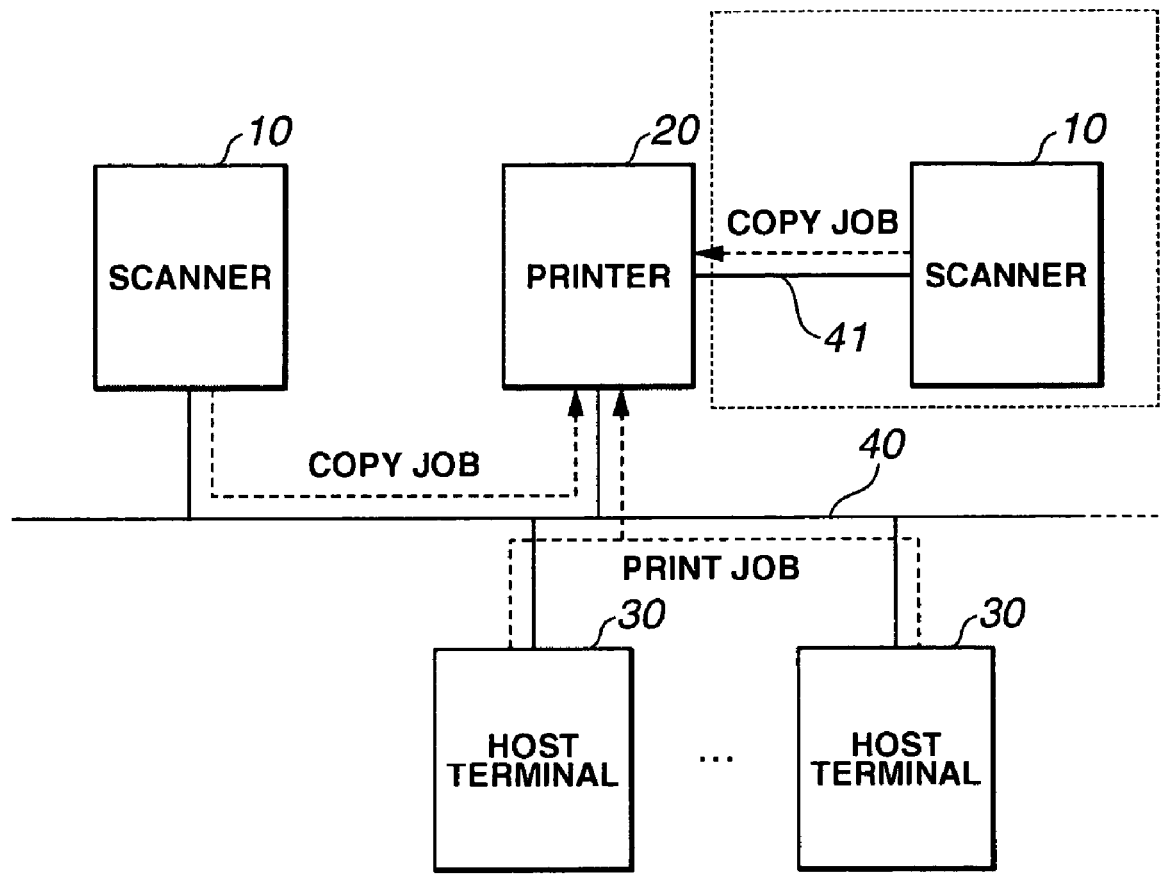
FIG. 1 is a block diagram showing an example of a whole construction of a printing system according to a first embodiment of the present invention.

FIG. 1 is a block diagram showing an example of a whole construction of the printing system according to the present invention.

This printing system has a scanner 10, a printer 20 and single or plural host terminals 30 which are connected over a network such as a LAN (Local Area Network) 40 or the like.

It is described in this embodiment that the scanner 10 and the printer 20 are connected over the LAN 40, but it is sufficient if the scanner 10 and the printer 20 can communicate mutually, and the scanner 10 and the printer 20 may be directly connected by a USB, a Centronics 41, or the like as shown in the area indicated by, for example, a dotted line.

The scanner 10 is an image reading device which reads figures, photos or characters from an original, which is placed on a platen glass or being moved on the platen glass by a scanning operation, and converts into digital data. Original image data (bitmap image) read here is written in a prescribed page description language and sent as a copy job to the printer 20, and its print processing is conducted by the printer 20.

The scanner 10 is provided with an operation panel (scanner operation panel 15 described later) which is relatively excellent in operability, and setting of conditions for reading the original and designation of the print setting values and the like of the read original image data can be made from the operation panel. Cancellation of a read job being conducted by the scanner 10 or a copy job prior to transmission to the printer can be instructed immediately from the operation panel.

The printer 20 is a printing device which receives a copy job from the scanner 10 or a print job from the host terminal 30, interprets the page description language in the job (hereinafter, the copy job and the print job are collectively referred to as the print job) and performs print processing. In conjunction with the scanner 10, the original image data read by the scanner 10 can be printed out by the printer 20 to realize a copy function.

The printer 20 is provided with an operation panel (printer operation panel 24) which mainly displays the characters only. Where this operation panel is used to make a cancellation operation of the print job stored in a job queue of the printer 20, the object job to be stopped is limited to the current job being processed because of the specifications of the printer 20.

The host terminal 30 is a personal computer operated by the user, and one or plural host terminals 30 are connected to the LAN 40. The user can select desired data to be printed from the host terminal 30 to request the printer 20 to print.

First Embodiment

Here, a first embodiment of the printing system having the whole construction shown in FIG. 1 will be described.

Figure 2:
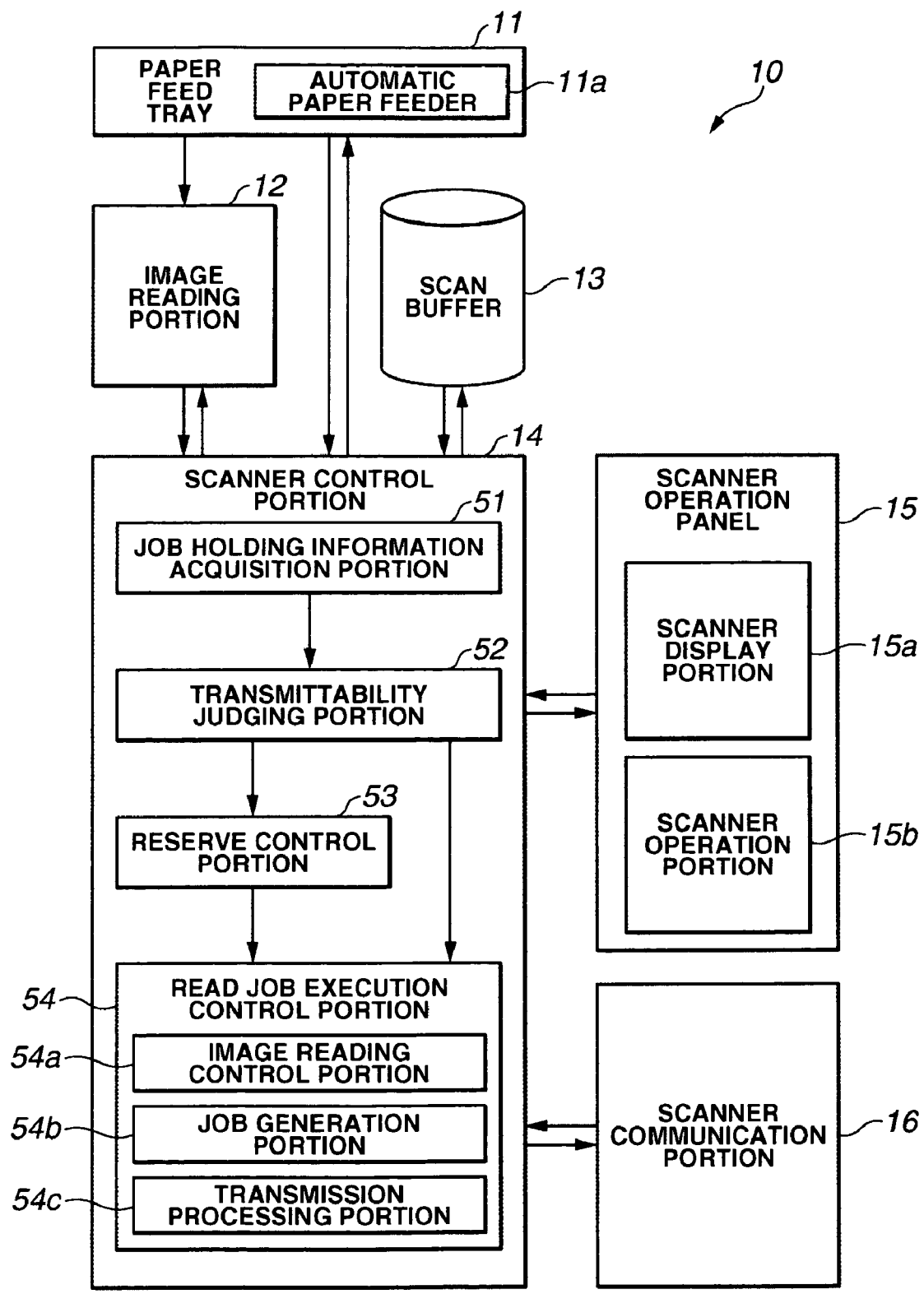
FIG. 2 is a block diagram showing an example of an internal structure of a scanner 10 according to the first embodiment of the present invention.

FIG. 2 is a block diagram showing an example of the internal structure of the scanner 10 according to the present invention. Here, only the constituent elements according to the present invention will be described.

The scanner 10 is configured of a paper feed tray 11 in which originals to be scanned are placed; an image reading portion 12 which is comprised of a lighting lamp, a lens, a CCD (Charge Coupled Device) and the like and scans the originals set in the paper feed tray 11 to read original image data; a scan buffer 13 which temporarily caches the read original image data; a scanner control section 14 which is comprised of a CPU (Central Processing Unit), a program memory, a working memory and the like and integrally controls the scanner 10 by the CPU which operates according to a program stored in the program memory; a scanner operation panel 15 which is a user interface connecting the user and the scanner 10; and a scanner communication portion 16 which is a communication interface device comprised of a network card, a USB port and the like and connects the scanner 10 and another device (the printer 20 or the like).

The paper feed tray 11 is provided with an automatic paper feeder 11a, and even when plural originals are set, the automatic paper feeder 11a feeds the originals one after another to convey to an unshown output tray along an unshown platen glass.

The image reading portion 12 scans the original, which is conveyed onto the platen glass by the automatic paper feeder 11a, to read original image data. By repeating the same process, the originals set in the paper feed tray 11 can be read continuously.

The scanner control section 14 has therein as various types of processing function portions a job holding information acquisition portion 51, a transmittability judging portion 52, a reserve control portion 53, and a read job execution control portion 54.

The job holding information acquisition portion 51 is a processing portion to obtain job holding information of the printer 20. The job holding information acquisition portion 51 sends a printer state acquisition request to the printer 20 and receives a printer state acquisition response in response to obtain a job holding state of the printer 20. The job holding information of this embodiment is information (job present, no job) whether there is a job being executed by the printer 20 or waiting for execution.

The transmittability judging portion 52 judges whether or not the copy job is sent to the printer 20. The transmittability judging portion 52 judges according to the job holding information of the printer 20 obtained by the job holding information acquisition portion 51 whether or not the copy job is sent. If the job holding information of the printer 20 is no job, it is allowed to send the copy job, but if job holding information of the printer 20 is job present, it is judged that the copy job is not allowed to be sent.

Specifically, the transmittability judging portion 52 judges whether or not the copy job can be sent so that the copy job from the scanner 10 is executed as a current job by the printer 20. Thus, the copy job can be cancelled immediately from the operation panel of the printer 20.

If it is judged by the transmittability judging portion 52 that it is not allowed to send the copy job, the reserve control portion 53 reserves the execution of a read job by the read job execution control portion 54 described later. If it is judged by the transmittability judging portion 52 while the read job is being reserved that the copy job can be sent, the reserve of the job is released.

The read job execution control portion 54 controls the execution of the read job including a scanning operation, a copy job generation, a copy job transmission processing and the like. The read job execution control portion 54 is comprised of an image reading control portion 54a which controls the operations of the automatic paper feeder 11a and the image reading portion 12 and controls the original reading processing, a job generation portion 54b which describes the read original image data in the page description language to generate a copy job, and a transmission processing portion 54c which executes transmission processing of the copy job generated by the job generation portion 54b.

The scanner operation panel 15 is an operation panel mounted on the body of the scanner 10 and provided with a scanner display portion 15a which is a display device such as an LED (Light Emitting Diode), an LCD (Liquid Crystal Display) or the like and a scanner operation portion 15b which is an input device such as a touch panel, hard buttons and the like. What are described above are descriptions of the block diagram showing the internal structure of the scanner 10 according to the present invention.

Figure 3:
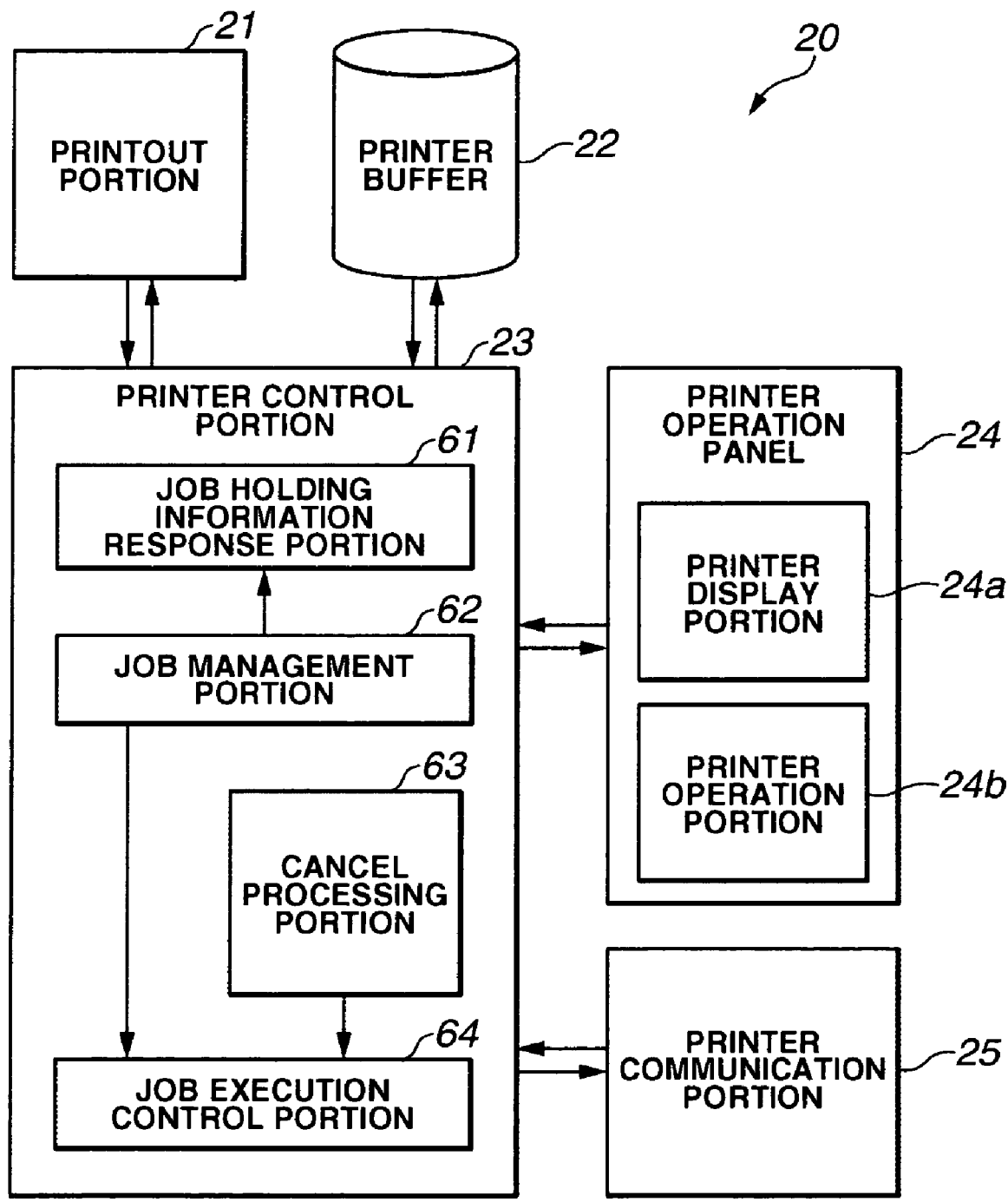
FIG. 3 is a block diagram showing an example of an internal structure of a printer 20 according to the first embodiment of the present invention.

FIG. 3 is a block diagram showing an example of an internal structure of the printer 20 according to the present invention. Here, only the constituent elements according to the present invention will be described.

The printer 20 is comprised of a printout portion 21 which is configured of a photoconductor drum, a transfer belt and the like and executes print processing according to the received print job; a printer buffer 22 which temporarily caches the print job; a printer control section 23 which is configured of a CPU (Central Processing Unit), a program memory, a working memory and the like and integrally controls the printer 20 by the CPU which operates according to a program stored in the program memory; a printer operation panel 24 which is a user interface connecting the user and the printer 20; and a printer communication portion 25 which is a communication interface device comprised of a network card, a USB port and the like and connects the printer 20 and another device (the scanner, the host terminal or the like).

The printer control section 23 is provided therein with a job holding information response portion 61, a job management portion 62, a cancel processing portion 63 and a job execution control portion 64 as various types of processing function portions.

The job holding information response portion 61 responds to an inquiry for job holding information from the scanner 10. More specifically, it receives a printer state acquisition request from the scanner 10, then obtains a job holding state from the job management portion 62 described later and sends back a printer state acquisition response according to the obtained state. In the printer state acquisition response, job present or no job is set.

The job management portion 62 manages the print job received from the scanner 10 or the host terminal 30 in a job queue. The job management portion 62 manages the print job following a first-in first-out order in the job queue, and the job execution control portion 64 described later executes sequentially from the first received print job.

The cancel processing portion 63 stops the execution of the print job by the job execution control portion 64 described later. For example, when the cancellation of the print job is instructed by the user from the printer operation panel 24 or the like, the cancellation of the pertinent job is cancelled according to the instruction.

The job execution control portion 64 controls the execution of the print job. For example, where a copy job is executed, it interprets the page description language in the copy job received from the scanner 10, controls the operation of the printout portion 21 and executes print processing of original image data read by the scanner 10.

The printer operation panel 24 is an operation panel mounted on the body of the printer 20 and provided with a printer display portion 24a which is a display device such as an LED (Light Emitting Diode), an LCD (Liquid Crystal Display) or the like and a printer operation portion 24b which is an input device such as hard buttons. What are described above are descriptions of the block diagram showing the internal structure of the printer 20 according to the present invention.

Figure 4:
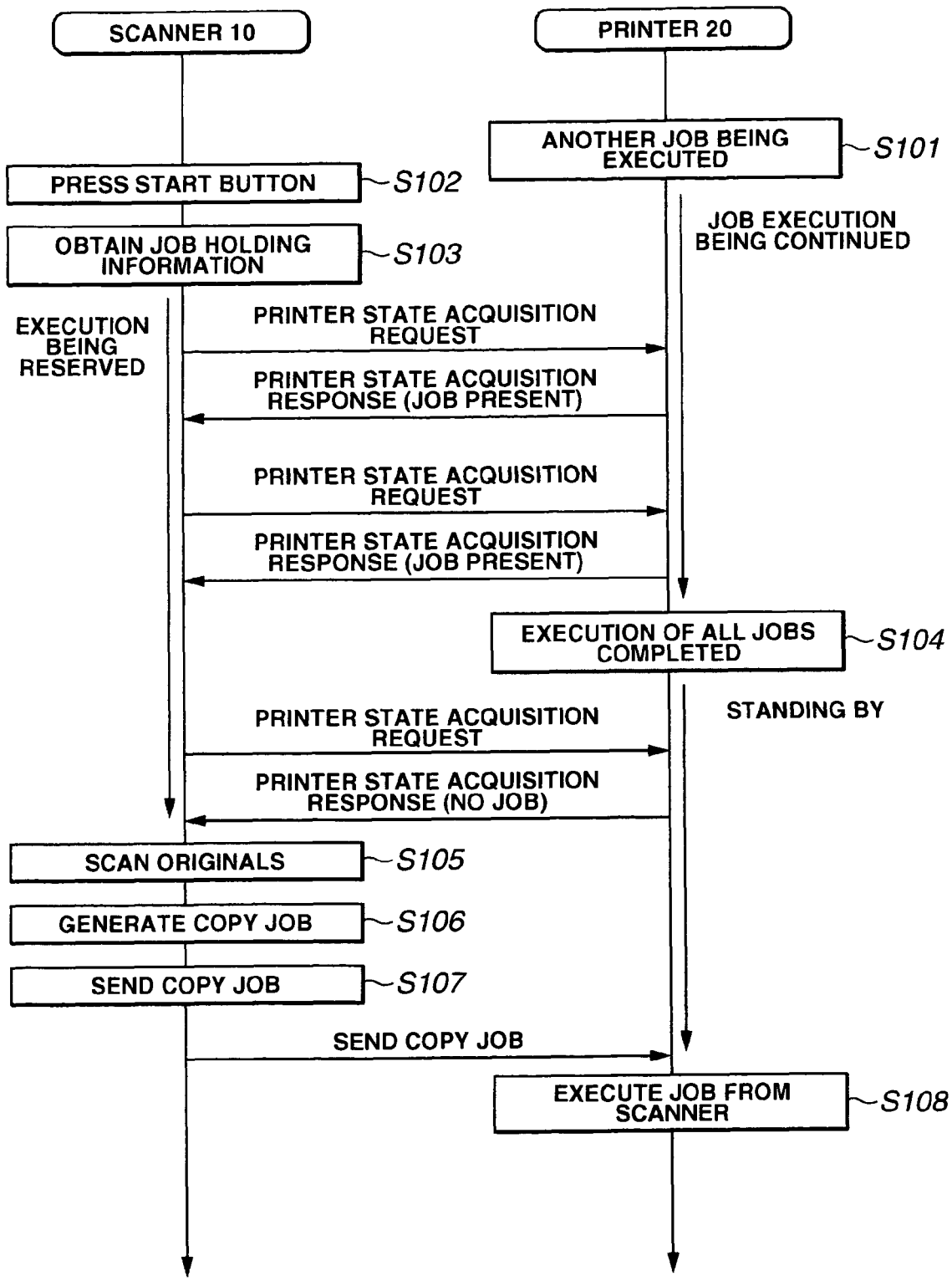
FIG. 4 is a sequence chart showing an example of an operation flow of the scanner 10 and the printer 20 according to the first embodiment of the present invention.

FIG. 4 is a sequence chart showing an example of an operation flow of the scanner 10 and the printer 20 according to the present invention.

Here, the printer 20 is in an execution state of a print job or another copy job (step S101). When the start button of the scanner 10 is pressed in this state to instruct the execution of a read job (step S102), and the scanner 10 obtains job holding information of the printer 20 (step S103). This processing is continued until no job remains if the job holding state of the printer 20 is job present, during which the execution of a read job such as a scanning operation, a copy job generation, a copy job transmission processing or the like which is started when the start button is pressed in step S102 is reserved.

In the job holding information acquisition processing, a printer state acquisition request is sent from the scanner 10, and a printer state acquisition response is sent back from the printer 20 in response. In FIG. 4, it is sent back by first and second printer state acquisition responses to the scanner 10 that a job is present.

And, the execution of the print job by the printer 20 is completed immediately after the second printer state acquisition response is received by the scanner 10 (step S104), so that a third printer state acquisition response indicating that the job holding state of the printer 20 is no job is sent back to the scanner 10.

When it is received that the job holding state of the printer 20 has become no job, the scanner 10 releases the reserve of the read job and starts scanning the original to read original image data (step S105). And, the original image data is described in a prescribed page description language to generate a copy job (step S106), which is then sent to the printer 20 (step S107).

The printer 20 in a job non-holding state receives the above job and executes the job immediately (step S108). In other words, the job received from the scanner 10 is executed as a current job.

Figure 5:
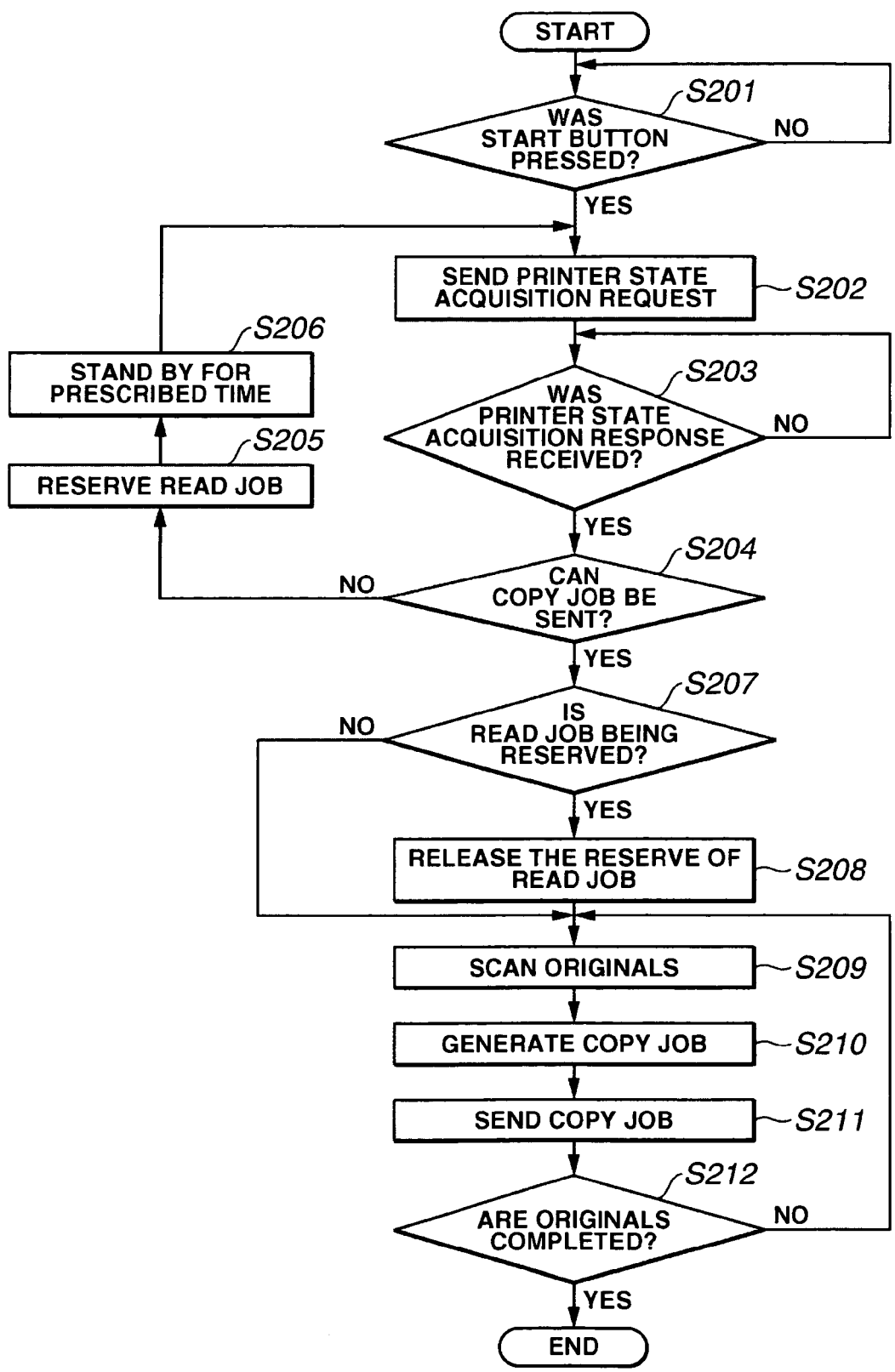
FIG. 5 is a flow chart showing an example of an operation of the scanner 10 according to the first embodiment of the present invention.

FIG. 5 is a flow chart showing an example of the operation of the scanner 10 according to the present invention.

The scanner 10 is standing by until the user sets originals in the paper feed tray 11 and presses the start button (NO in step S201).

Here, when the start button is pressed to instruct the execution of the read job (YES in step S201), the scanner 10 first obtains job holding information of the printer 20 by the job holding information acquisition portion 51. Specifically, a printer state acquisition request is sent to the printer 20 (step S202), and a response to it is received to obtain job holding information of the printer 20.

The scanner 10 having sent the printer state acquisition request waits for a response (NO in step S203). When a response is received from the printer 20 when standing by (YES in step S203), it is judged by the transmittability judging portion 52 whether or not a copy job is sent depending on the job holding state of the printer 20. As described above, when the job holding information of the printer 20 is no job, the transmission of the copy job is permitted, but when the job holding information of the printer 20 is job present, it is judged that the copy job transmission is disapproved.

Here, when it is judged by the transmittability judging portion 52 that copy job transmission is disapproved (NO in step S204), the execution of the read job such as a scanning operation, copy job generation, copy job transmission processing or the like is controlled to a reserve state by the reserve control portion 53 (step S205). After standing by for a prescribed time (step S206), the process returns to step S202, and a printer state acquisition request is sent to the printer 20.

Meanwhile, when it is judged by the transmittability judging portion 52 that the copy job can be sent (YES in step S204), if the read job is reserved (YES in step S207), it is released (step S208), and if the read job is not reserved (NO in step S207), the read job is executed as it is.

When the read job is started, the image reading control portion 54a controls the operation of the automatic paper feeder 11a and the image reading portion 12 and reads original image data from the originals set in the paper feed tray 11 (step S209).

And, a copy job having described the original image data in a prescribed page description language is generated by the job generation portion 54b (step S210), and the copy job is sent to the printer 20 by the transmission processing portion 54c (step S211).

The processing from step S209 to step S211 is repeated until all the originals set in the paper feed tray 11 run out (NO in S212), and when the processing on all the originals is completed (YES in step S212), this processing is terminated.

As described above, the present invention is configured such that at the time of sending the copy job from the scanner 10, job holding information indicating a job holding state is obtained from the printer 20, and when the printer 20 is in a job holding state, it is judged that the transmission of the copy job is disapproved, and the transmission of the copy job is reserved until the job held by the printer 20 runs out. Therefore, the printer 20 can always execute the job from the scanner 10 as a current job.

Thus, even if only an instruction to cancel the current job can be made from the operation panel of the printer 20, the copy job can be cancelled immediately. The copy job from the side of the scanner 10 executed by the printer 20 is always executed as a current job, so that a possibility of causing an erroneous operation to cancel another job is low.

Accordingly, the processing to cancel a job from the scanner 10 can be made immediately and securely while utilizing the specifications of the current printer 20.

Second Embodiment

Then, the second embodiment of the printing system having the whole construction shown in FIG. 1 will be described. In the second embodiment, the voluntary notification of the job holding state of the printer 20 from the side of the printer 20 to the scanner 10 will be described.

Figure 6:
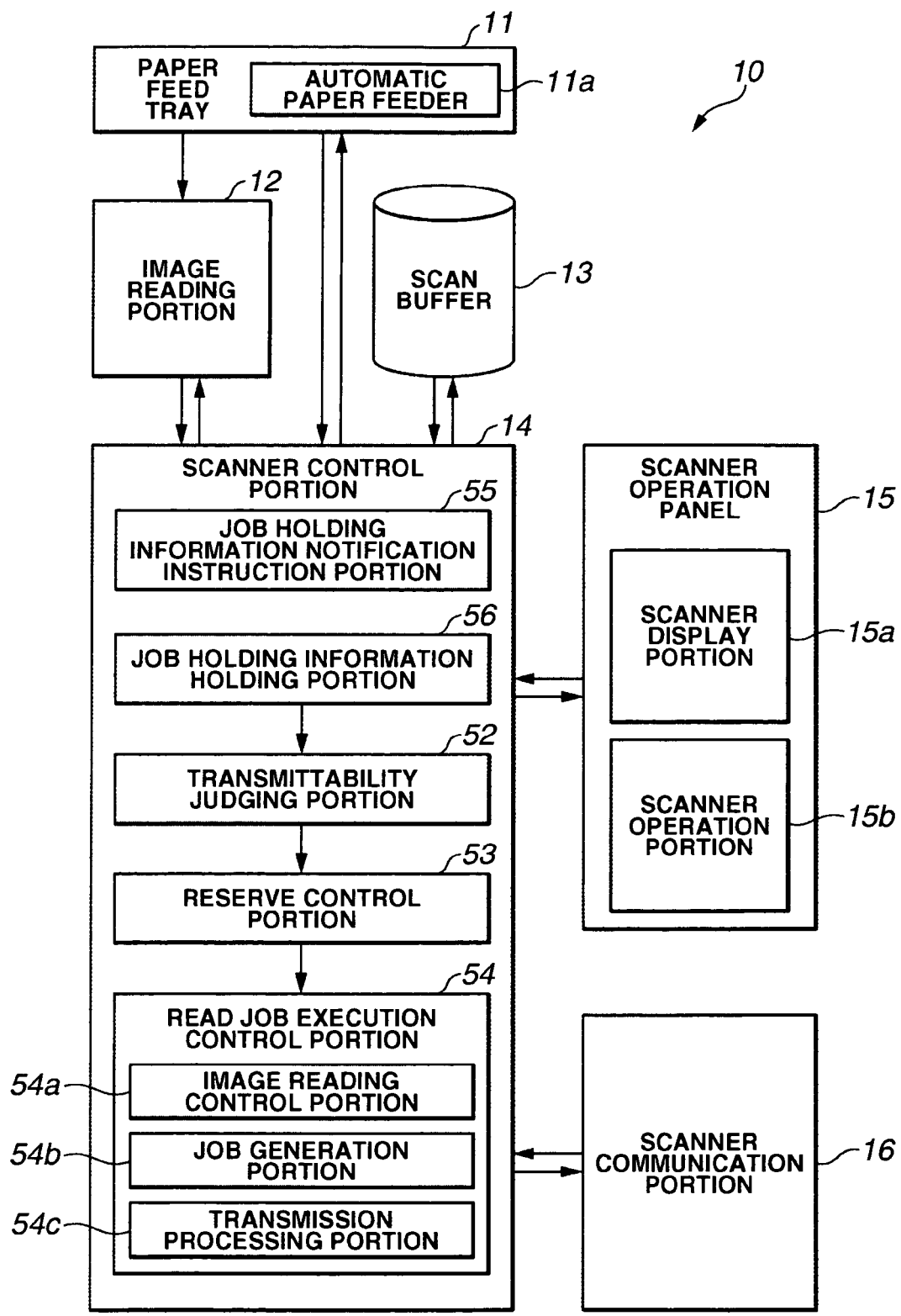
FIG. 6 is a block diagram showing an example of an internal structure of the scanner 10 according to a second embodiment of the present invention.

FIG. 6 is a block diagram showing an example of the internal structure of the scanner 10 according to the second embodiment. The elements indicated by the same reference numerals as those in FIG. 2 illustrating the first embodiment also operate substantially in the same way, and only differences are described below.

The scanner 10 is comprised of a paper feed tray 11, an image reading portion 12, a scan buffer 13, a scanner control section 14, a scanner operation panel 15 and a scanner communication portion 16. Those other than the scanner control section 14 have the same configuration as those described with reference to FIG. 2.

The scanner control section 14 is provided therein with a transmittability judging portion 52, a reserve control portion 53, a read job execution control portion 54, a job holding information notice instruction portion 55 and a job holding information retention portion 56. In other words, the job holding information acquisition portion 51 is excluded from the structure of the first embodiment described with reference to FIG. 2, and the job holding information notice instruction portion 55 and the job holding information retention portion 56 are added instead.

The job holding information notice instruction portion 55 voluntarily instructs (voluntary notification instruction) to notify the job holding information of the printer 20 from the side of the printer 20. For example, when it is determined to make a voluntary notification instruction according to the setting information on the side of the scanner 10, the voluntary notification instruction is transmitted from the job holding information notice instruction portion 55 to the printer 20 when the scanner 10 is activated.

The job holding information retention portion 56 holds the job holding information of the printer 20 voluntarily notified from the printer 20. In other words, it holds information (job present, no job) whether or not there is a job being executed by the printer 20 or waiting for execution. What are described above are descriptions of the block diagram showing the internal structure of the scanner 10 according to the second embodiment.

Figure 7:
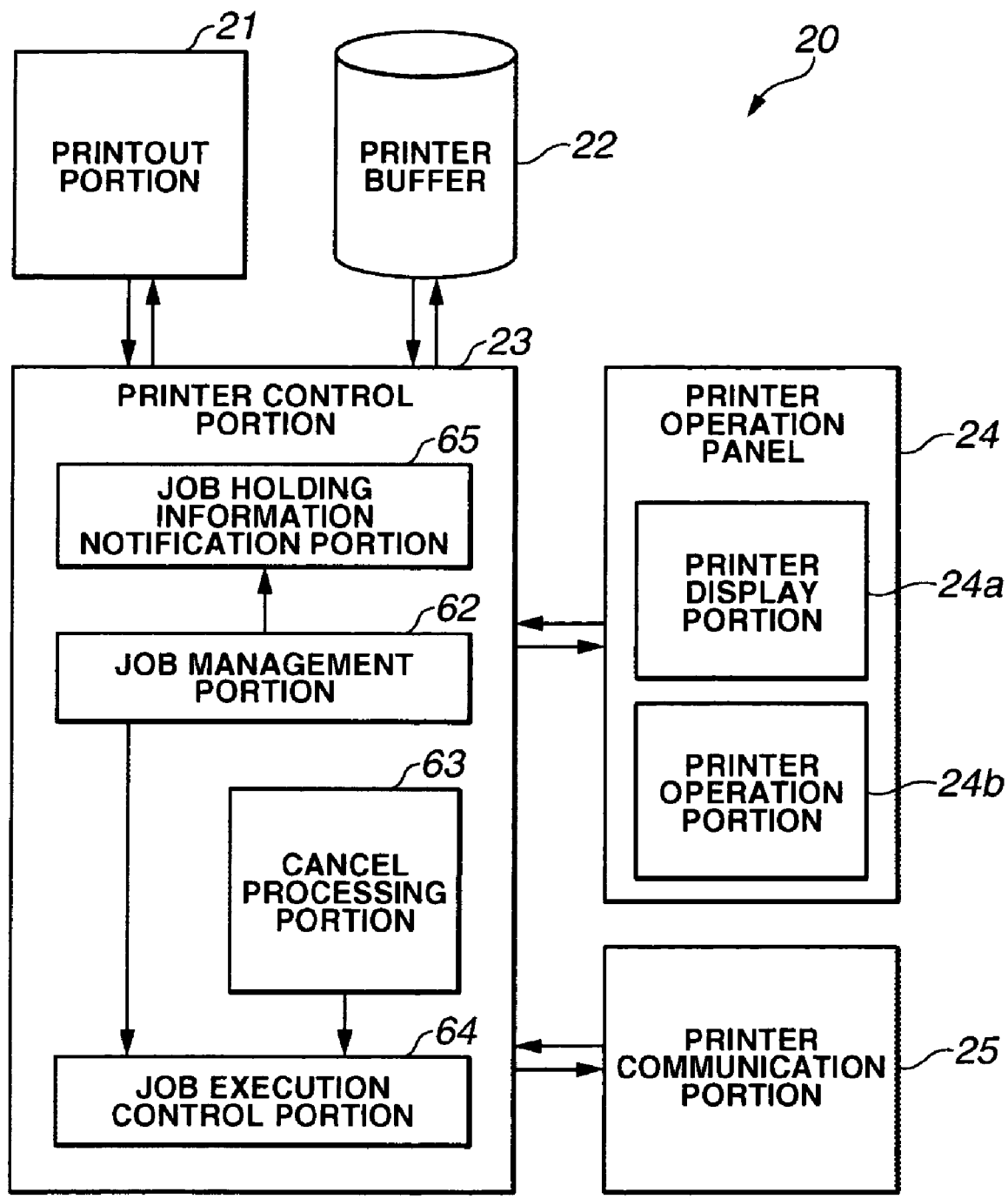
FIG. 7 is a block diagram showing an example of an internal structure of the printer 20 according to the second embodiment of the present invention.

FIG. 7 is a block diagram showing an example of the internal structure of the printer 20 according to the second embodiment. The elements indicated by the same reference numerals as those in FIG. 3 illustrating the first embodiment also operate substantially in the same way, and only differences are described below.

The printer 20 is comprised of a printout portion 21, a printer buffer 22, a printer control section 23, a printer operation panel 24 and a printer communication portion 25. The printer 20 is configured in the same manner as that described with reference to FIG. 3 excepting the printer control section 23.

The printer control section 23 is provided therein with a job management portion 62, a cancel processing portion 63, a job execution control portion 64 and a job holding information notification portion 65. In other words, it is configured by removing the job holding information response portion 61 from the structure of the first embodiment described with reference to FIG. 3 and adding the job holding information notification portion 65.

The job holding information notification portion 65 receives a voluntary notification instruction from the scanner 10 and sends a printer state notice to the scanner 10 every time the job holding state of the printer 20 makes a transition. The job holding information notification portion 65 obtains a job holding state from the job management portion 62 and sends a printer state notice according to the job holding state. Job present or no job is set in the printer state notice. What are described above are descriptions of the block diagram showing the internal structure of the printer 20 according to the second embodiment.

Figure 8:
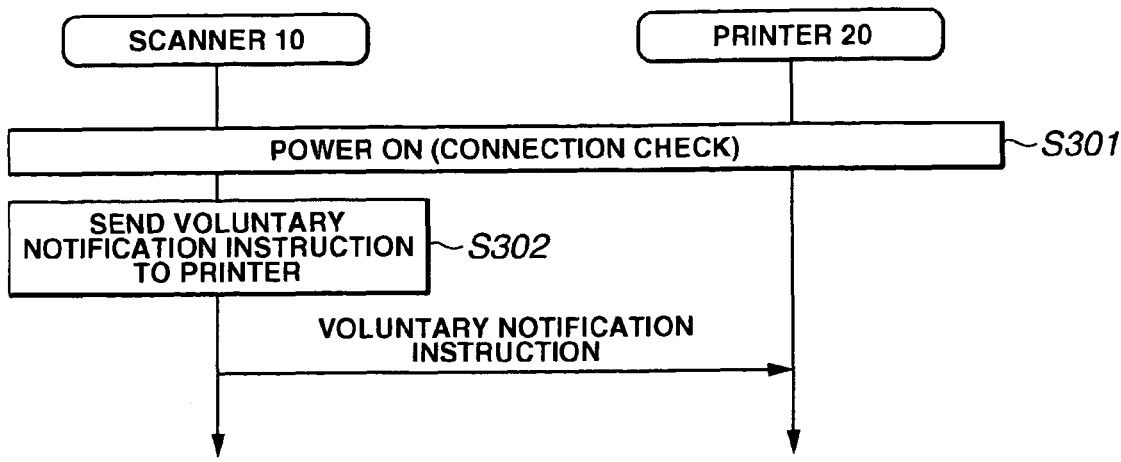
FIG. 8 is a sequence chart showing an example of an operation flow of the scanner 10 and the printer 20 according to the second embodiment of the present invention.
Figure 8:
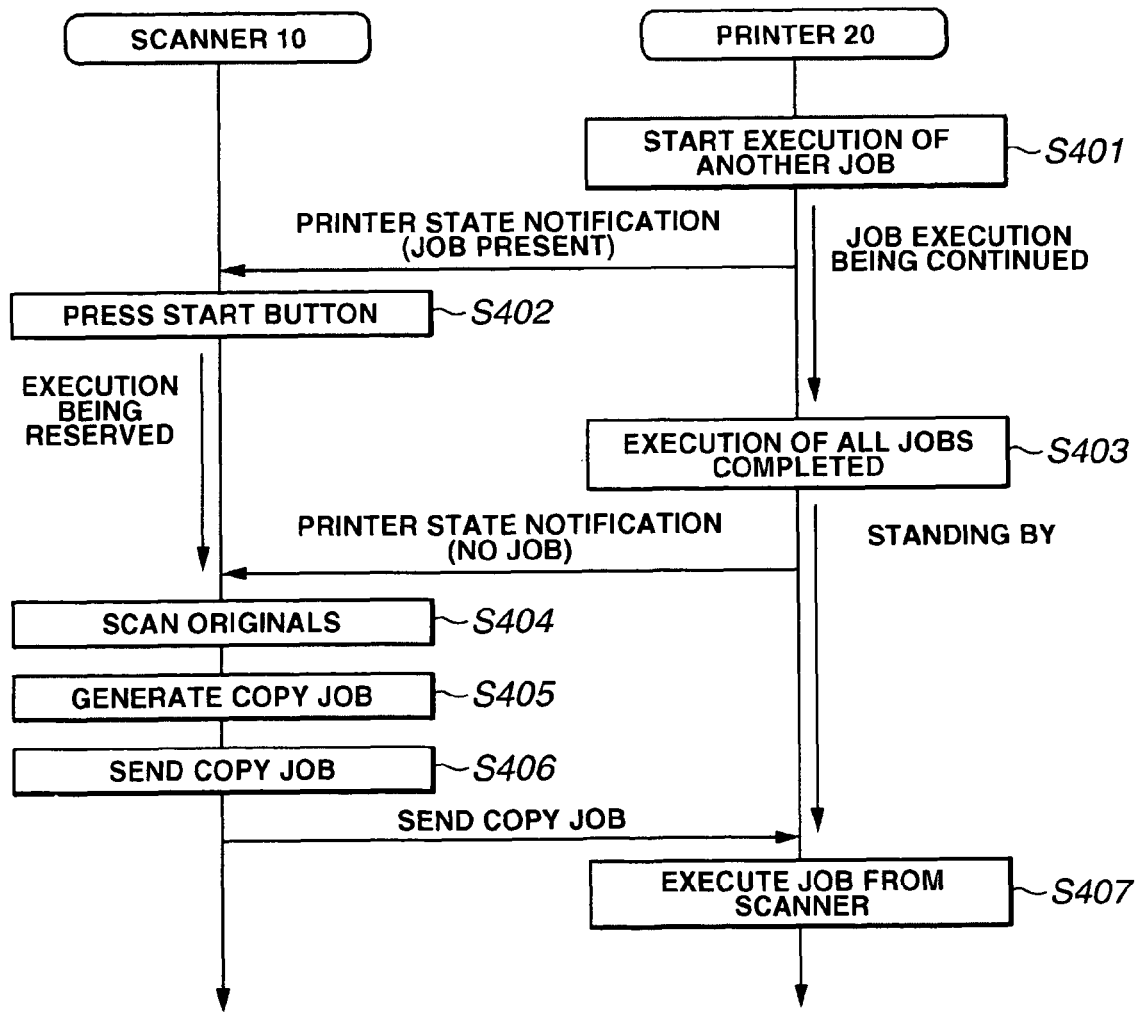

FIG. 8 is a sequence chart showing an example of an operation flow of the scanner 10 and the printer 20 according to the second embodiment.

FIG. 8 shows the operation of the scanner 10 and the printer 20 in a negotiation phase and the operation of the scanner 10 and the printer 20 in an operation phase.

First, an operation flow in the negotiation phase will be described. When the scanner 10 and the printer 20 are powered on, initial processing such as connection confirmation is performed between them (step S301).

Then, a voluntary notification instruction is sent from the scanner 10 to the printer 20 (step S302). The printer 20 having received the notice voluntarily sends a printer state notice to the scanner 10 to notify the job holding information.

Then, an operation flow in the operation phase will be described. Here, it is assumed that the voluntary notification instruction is previously sent from the scanner 10 to the printer 20.

First, the printer 20 starts the execution of the print job or another copy job (step S401). When the execution of the print job is started by the printer 20, a printer state notice is sent from the job holding information notification portion 65 as the job holding state of the printer 20 makes a transition. At this time, job present is set as job holding information in the printer state notice.

Upon receiving the printer state notice, the scanner 10 recognizes that another print job is being executed by the printer 20 or waiting for execution. In this state, when the start button of the scanner 10 is pressed to instruct the execution of the read job (step S402), the scanner 10 reserves the execution of the read job such as a scanning operation, copy job generation, copy job transmission processing or the like which is started when the start button is pressed in step S402 because the scanner 10 has grasped that the print job is being executed by the printer 20 or waiting for execution.

Here, when the job by the printer 20 is completed (step S403), a printer state notice is sent from the job holding information notification portion 65 to the scanner 10 as the job holding state of the printer has made a transition. At this time, no job is set as job holding information in the printer state notice.

When the scanner 10 having received the printer state notice grasps that the printer 20 does not have a job, it releases the reserve of the read job and starts scanning the original to read original image data (step S404). And, it describes the original image data in a prescribed page description language to generate a copy job (step S405) and sends to the printer 20 (step S406). The printer 20 in a job non-holding state receives the job and executes the job immediately (step S407). In other words, the job received from the scanner 10 is executed as a current job.

Figure 9:
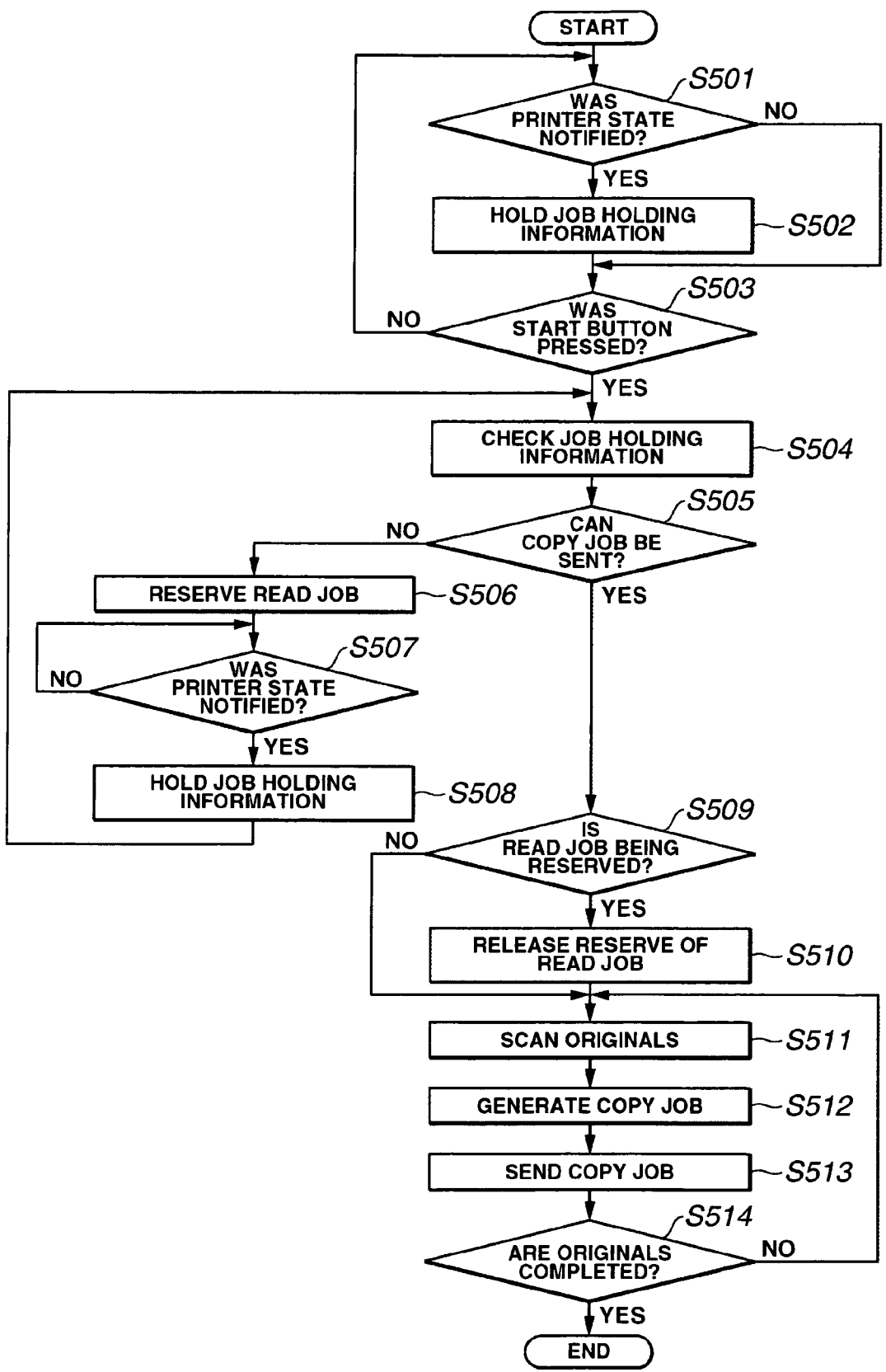
FIG. 9 is a flow chart showing an example of an operation of the scanner 10 according to the second embodiment of the present invention.

FIG. 9 is a flow chart showing an example of the operation of the scanner 10 according to the second embodiment. Here, descriptions will be made on the assumption that a voluntary notification instruction has been sent in advance from the scanner 10 to the printer 20.

The scanner 10 receives a printer state from the printer 20 (NO in step S501) or stands by until the start button is pressed by the user (NO in step S503).

Here, when the printer state notice is received from the printer 20 (YES in step S501), the job holding information retention portion 56 of the scanner 10 holds the job holding information (step S502).

When the start button is pressed to instruct the execution of the read job (YES in step S503), the scanner 10 checks the job holding information of the printer 20 held by the job holding information retention portion 56 (step S504), and it is judged by the transmittability judging portion 52 whether or not the copy job is sent (step S505). As described above, when the job holding information of the printer 20 is no job, it is allowed to send the copy job, but when the job holding information of the printer 20 is job present, it is judged that the transmission of the copy job is disapproved.

If it is judged by the transmittability judging portion 52 that the transmission of the copy job is disapproved (NO in step S505), the execution of the read job such as a scanning operation, copy job generation, copy job transmission processing or the like is controlled to a reserve state by the reserve control portion 53 (step S506), and the scanner 10 stands by until job holding information is received from the printer 20 (NO in step S507).

While standing by, when a printer state notice is received from the printer 20 (YES in step S507), the job holding information retention portion 56 of the scanner 10 holds the job holding information (step S508), the process returns to step S504, and it is judged whether the copy job is transmitted.

Meanwhile, when it is judged by the transmittability judging portion 52 in step S505 that the job can be transmitted (YES in step S505) and if the read job is reserved (YES in step S509), the reserve is released (step S510), and if the read job is not reserved (NO in step S509), the execution of the read job is started as it is.

When the read job is started, the image reading control portion 54a first controls the operation of the automatic paper feeder 11a and the image reading portion 12 to read original image data from the originals set in the paper feed tray 11 (step S511).

And, a copy job having the original image data described in a prescribed page description language is generated by the job generation portion 54b (step S512), and the copy job is transmitted to the printer 20 by the transmission processing portion 54c (step S513).

The process from step S511 through step S513 is repeated until all the originals set in the paper feed tray 11 run out (NO in step S514), and when the processing of all the originals is completed (YES in step S514), the processing is terminated.

As described above, the second embodiment is configured such that the printer 20 is provided with the job holding information notification portion 65, and the job holding state of the printer 20 is voluntarily notified from the side of the printer 20 to the scanner 10. Therefore, the processing to cancel the job from the scanner 10 can be made immediately and securely while utilizing the specifications of the current printer 20 in the same way as in the first embodiment.

Third Embodiment

Then, the third embodiment of the printing system having the whole construction shown in FIG. 1 will be described. The operation of reserving only a transmission processing of the copy job from the side of the scanner 10 when the printer 20 is in a job holding state (job present) will be described in the third embodiment.

The internal structures of the scanner 10 and the printer 20 according to the third embodiment are substantially the same as those of the first embodiment described with reference to FIG. 2 and FIG. 3, so that their descriptions are omitted, and only the operations thereof will be described.

FIG. 9 is a sequence chart showing an example of an operation flow of the scanner 10 and the printer 20 according to the third embodiment.

Here, the printer 20 is in a state of executing a print job or another copy job (step S601). In this state, when the start button of the scanner 10 is pressed to instruct the execution of a read job (step S602), the scanner 10 starts scanning the originals to read original image data (step S603) and generates a copy job which has the original image data described in a prescribed page description language (step S604).

When the processing before the transmission of the copy job is completed as described above, the scanner 10 obtains job holding information of the printer 20 (step S605). This processing is continued until the job holding state of the printer 20 becomes no job if it is job present, and the transmission of the copy job is reserved during the above processing.

By the above job holding information obtaining process, a printer state acquisition request is transmitted from the scanner 10, and a printer state acquisition response is sent back from the printer 20 in response. In FIG. 9, job present is sent back to the scanner 10 by the first and second printer state acquisition responses.

And, the execution of the print job by the printer 20 is completed immediately after the reception of the second printer state acquisition response by the scanner 10 (step 606), so that a third printer state acquisition response indicating that the job holding state of the printer 20 is no job is sent back to the scanner 10.

Upon receiving that the job holding state of the printer 20 has become no job, the scanner 10 releases the reserve of the copy job transmission and sends the copy job to the printer 20 (step S607).

The printer 20 in the job non-holding state receives the job and immediately executes it (step S608). Specifically, the printer 20 executes the job received from the scanner 10 as a current job.

Figure 10:
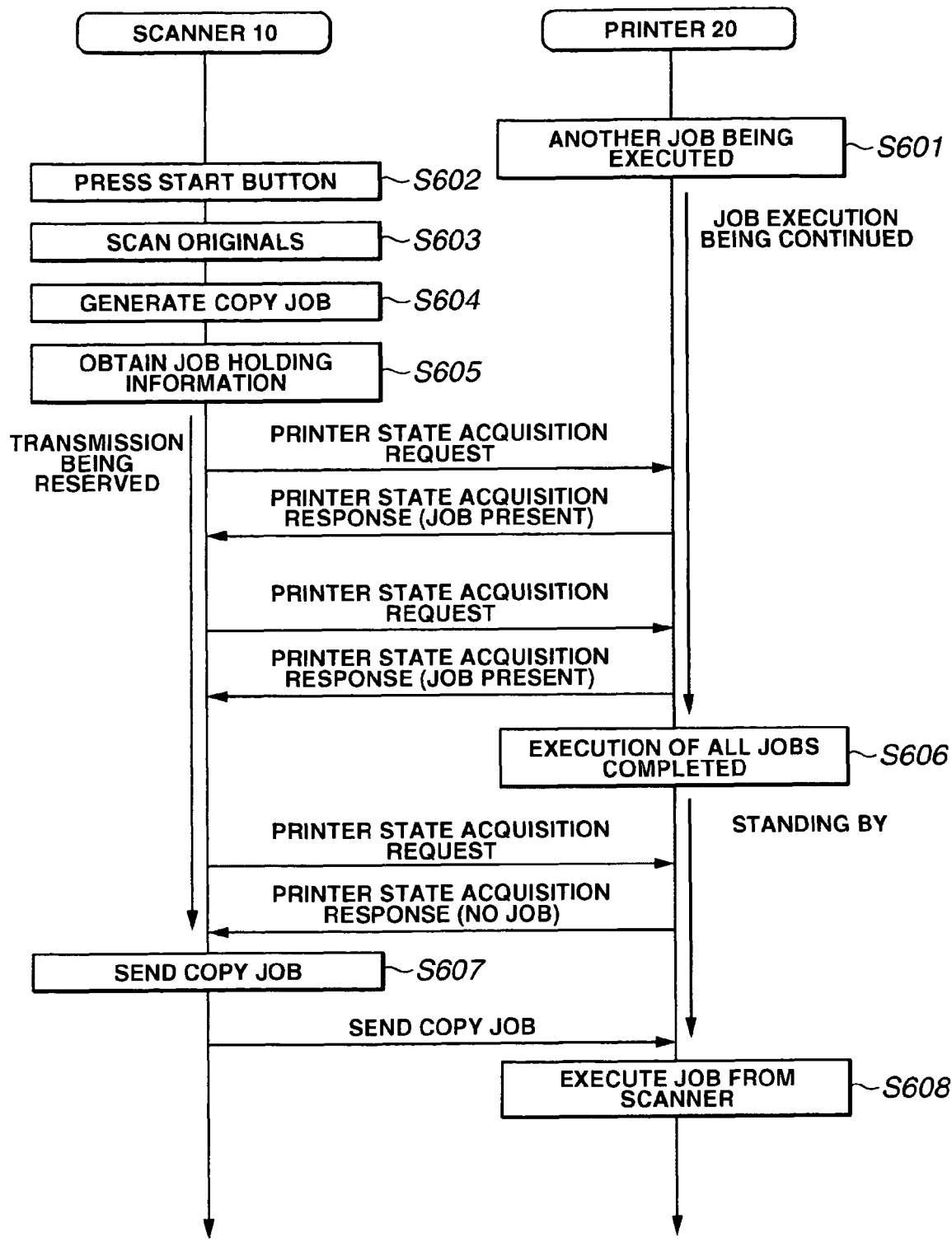
FIG. 10 is a sequence chart showing an example of an operation flow of the scanner 10 and the printer 20 according to a third embodiment of the present invention.
Figure 11:
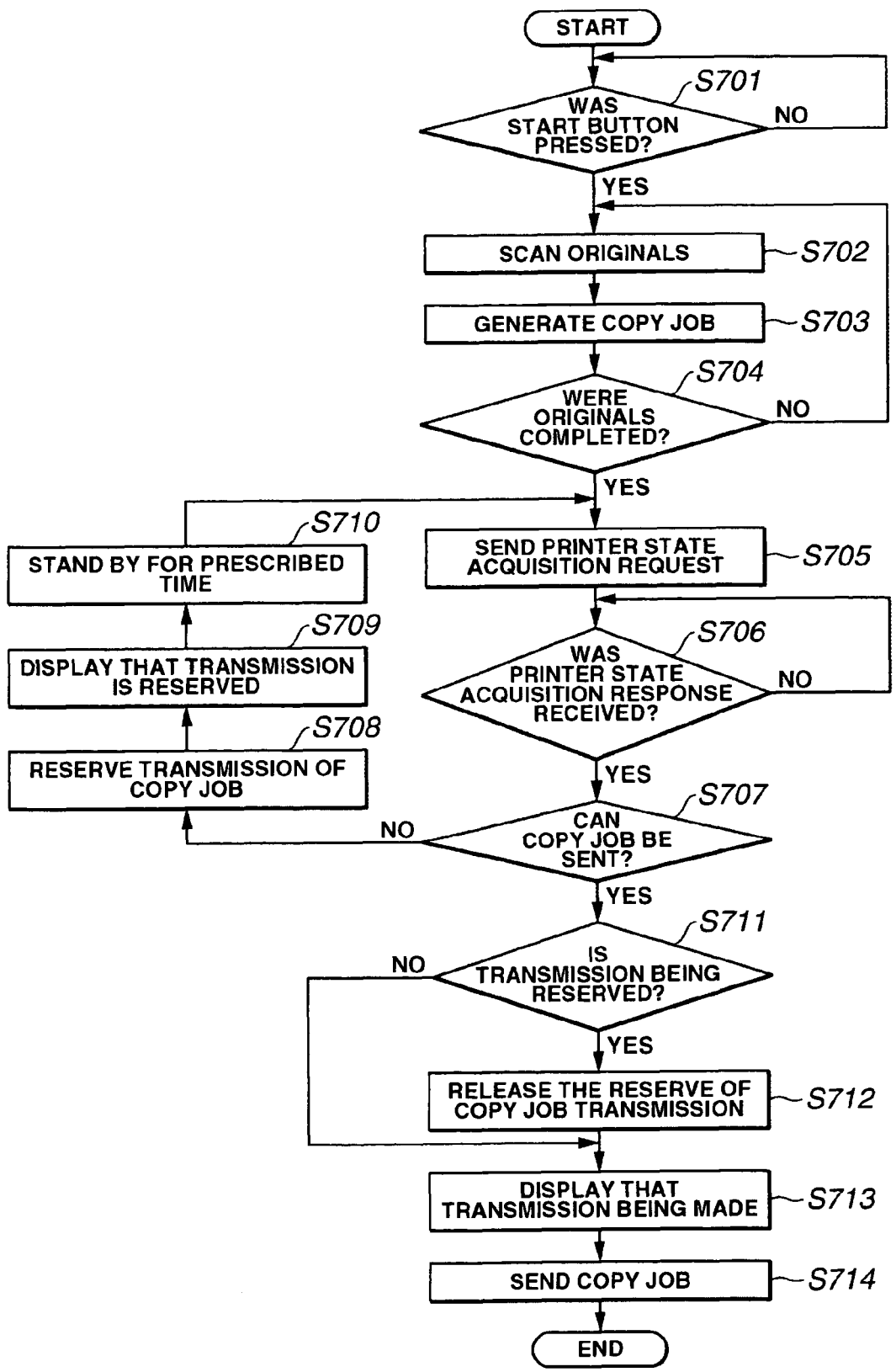
FIG. 11 is a flow chart showing an example of an operation of the scanner 10 according to the third embodiment of the present invention.

FIG. 10 is a flow chart showing an example of the operation of the scanner 10 according to the present invention.

The scanner 10 is standing by until the user sets originals in the paper feed tray 11 and presses the start button (NO in step S701).

Here, when the start button is pressed to instruct the execution of the read job (YES in step S701), the scanner 10 starts executing the read job.

When the read job is started, the image reading control portion 54a first controls the operation of the automatic paper feeder 11a and the image reading portion 12 and reads original image data from the originals set in the paper feed tray 11 (step S702).

And, the job generation portion 54b generates a copy job having the original image data described in a prescribed page description language (step S703). The generated copy job is temporarily saved in a memory (hard disk may be disposed for storing) or the like.

The processing from step S702 to step S703 is repeated until all the originals set in the paper feed tray 11 run out (NO in step S704). When the processing of all the originals is completed (YES in step S704), job holding information of the printer 20 is obtained by the job holding information acquisition portion 51. Specifically, a printer state acquisition request is sent to the printer 20 (step S705), a response to it is received, and job holding information of the printer 20 is obtained.

The scanner 10 having sent the printer state acquisition request waits for a response (NO in step S706). And, when a response is received from the printer 20 while waiting (YES in step S706), it is judged depending on the job holding state of the printer 20 by the transmittability judging portion 52 whether or not a copy job is transmitted. As described above, if the job holding information of the printer 20 is no job, the transmission of the copy job is permitted, but if the job holding information of the printer 20 is job present, it is judged that the transmission of the copy job is disapproved.

Here, if it is judged by the transmittability judging portion 52 that the transmission of the copy job is disapproved (NO in step S707), the transmission of the copy job is controlled to a reserve state by the reserve control portion 53 (step S708), and it is displayed on the scanner display portion 15a that the transmission is reserved (step S709). Here, the reason of displaying that the transmission is reserved is that it is difficult for the user to grasp which of the scanner 10 and the printer 20 executes the job because the operation such as the scanning operation of the scanner 10, which can be visually checked by the user, has completed, and there is a possibility that the job cannot be cancelled properly when the user instructs the cancellation of the job.

The scanner 10 which has stood by for a prescribed time while displaying that the transmission is reserved (step S710) returns to step S705 and sends a printer state acquisition request to the printer 20.

Meanwhile, when it is judged by the transmittability judging portion 52 in step S707 that the copy job can be transmitted (YES in step S707) and if the transmission of the copy job is reserved (YES in step S711), the reserve is released (step S712), and if the transmission of the copy job is not reserved (NO in step S707), it is shown on the scanner display portion 15a that the copy job is being transmitted (step S713), the transmission of the copy job is started (step S714), and this processing is terminated.

In the third embodiment, for convenience of description, it was described to obtain the job holding information of the printer 20 after the completion of the processing such as the scanning operation of the originals. But the order of processing is not particularly determined because the functions of the present invention can be realized if the transmittability of the copy job can be judged prior to the transmission of the copy job. For example, the job holding information of the printer may be obtained during the scanning operation, or the copy job may be transmitted while scanning if the transmittability of the copy job can be judged during the scanning operation.

As described above, the third embodiment is configured to reserve only the transmission processing of the copy job from the side of the scanner 10 if the printer 20 is in a job holding state (job present). Therefore, even if the printer 20 is in the job holding state, the scanning operation is executed previously, so that there is a high possibility that the processing time of the entire operation can be decreased.

It was described in the first through third embodiments that the job holding information of the printer 20 is information of job present or no job but not limited to it, and the functions of the present invention can be realized if information can be used to judge whether or not the copy job to be transmitted from the side of the scanner 10 is executed as a current job at the side of the printer 20.

For example, the job holding information may be the number of jobs stored in a job queue of the printer 20 and may be a state (processing, standing by, or the lie) of the printer 20.

The present invention is not limited to the embodiments described above and shown in the drawings and various modifications may be made without deviating from the spirit and scope of the invention. For example, the printing system according to the present invention was described with reference to the first through third embodiments, but all or part of the first through third embodiments may be combined for practice.

As described above, a first aspect of the present invention provides a printing system including a printing device which has a cancel instruction unit that instructs cancellation of a current job being processed from an operation panel, and an image reading device that describes original image data read from an original in a page description language and sends to the printing device, wherein the image reading device comprises: an acquisition unit that obtains job holding information indicating a job holding state from the printing device; a control unit that reads original image data from the original, describes the read original image data in the page description language and sends it as a copy job to the printing device; and a reserve control unit that reserves at least the transmission of the copy job to the printing device until the job held by the printing device runs out when it is judged according to the job holding information obtained by the acquisition unit that the printing device is in a job holding state.

A second aspect of the present invention provides the printing system according to the first aspect of the invention, wherein the reserve control unit releases the reserve when it is judged according to the job holding information obtained by the acquisition unit that the job held by the printing device runs out.

A third aspect of the present invention provides the printing system according to the first aspect of the invention, wherein the control unit includes: an image reading control unit that executes scanning of the original to control reading of original image data; a copy job generation unit that describes the original image data read by the image reading control unit in a page description language to generate the copy job; and a transmission unit that sends the copy job generated by the copy job generation unit to the printing device, wherein: when it is judged according to the job holding information obtained by the acquisition unit that the printing device is in a job holding state, the reserve control unit reserves an original reading processing by the image reading control unit, a copy job generation processing by the copy job generation unit and a copy job transmission processing by the transmission unit.

A fourth aspect of the present invention provides the printing system according to the first aspect of the invention, wherein the control unit includes: a transmission unit that describes the original image data in a page description language and sends it as a copy job to the printing device; and when it is judged according to the job holding information obtained by the acquisition unit that the printing device is in a job holding state, the reserve control unit reserves the copy job transmission processing by the transmission unit.

A fifth aspect of the present invention provides an image reading device which describes original image data read from an original in a page description language and sends it to a printing device which has a cancel instruction unit that instructs cancellation of a current job being processed from an operation panel, comprising: an acquisition unit that obtains job holding information indicating a job holding state from the printing device; a control unit that reads original image data from the original, describes the read original image data in a page description language and sends it as a copy job to the printing device; and a reserve control unit that reserves at least the transmission of the copy job to the printing device until the job held by the printing device runs out when it is judged according to the job holding information obtained by the acquisition unit that the printing device is in a job holding state.

A sixth aspect of the present invention provides the image reading device according to the fifth aspect of the invention, wherein the reserve control unit releases the reserve when it is judged according to the job holding information obtained by the acquisition unit that the job held by the printing device runs out.

A seventh aspect of the present invention provides the image reading device according to the fifth aspect of the invention, wherein the control unit includes: an image reading control unit that controls reading of original image data executes scanning of the original; a copy job generation unit that describes the original image data read by the image reading control unit in a page description language to generate the copy job; and a transmission unit that sends the copy job generated by the copy job generation unit to the printing device, wherein: when it is judged according to the job holding information obtained by the acquisition unit that the printing device is in a job holding state, the reserve control unit reserves an original reading processing by the image reading control unit, a copy job generation processing by the copy job generation unit and a copy job transmission processing by the transmission unit.

An eighth aspect of the present invention provides the image reading device according to the fifth aspect of the invention, wherein the control unit includes: a transmission unit that describes the original image data in a page description language and sends it as a copy job to the printing device; and when it is judged according to the job holding information obtained by the acquisition unit that the printing device is in a job holding state, the reserve control unit reserves the copy job transmission processing by the transmission unit.

A ninth aspect of the present invention provides a method of controlling an image reading device which describes original image data read from an original in a page description language and sends it to a printing device which has a cancel instruction unit that instructs cancellation of a current job being processed from an operation panel, the method including: obtaining job holding information indicating a job holding state from the printing device by an acquisition unit; reading original image data from the original, describing the read original image data in a page description language and sending it as a copy job to the printing device by a control unit; reserving at least the transmission of the copy job to the printing device by a reserve control unit until the job held by the printing device runs out when the printing device is in a job holding state according to the job holding information obtained by the acquisition unit; and releasing the reserve by the reserve control unit when the job held by the printing device runs out according to the job holding information obtained by the acquisition unit.

The present invention is configured such that job holding information indicating a job holding state is obtained from the printing device, and when the printing device is in a job holding state according to the job holding information, at least the transmission of the copy job from the side of the image reading device is reserved until the job held by the printing device runs out. Therefore, the printing device can always execute the job from the image reading device side as the current job.

Thus, the copy job can be cancelled immediately even if the operation panel of the printing device is limited to an instruction of only the processing to cancel the current job. And, the copy job, which is executed by the printing device, from the image reading device side is always executed as a current job, so that a possibility of an erroneous operation to cancel another job is low.

Thus, the present invention provides the effects that the processing of canceling the job from the image reading device can be made immediately and securely while utilizing the specifications of the existing printing device.

The printing system, the image reading device and the control method thereof of the present invention can be applied to the printing system in general which is provided with the image reading device and the printing device, and especially, even if an erroneous original reading process is started by the image reading device side, its cancellation can be made immediately and securely.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-180754 filed on Jun. 21, 2005 including specification, claims, drawings and abstract is incorporated herein by reference in its entirety.

What is claimed is:

1. A printing system, comprising:
a printing device; and
an image reading device that is connected to the printing device directly or through a network, wherein:
the printing device comprises:
a print controller that controls printing by sequentially reserving in a queue a print job requested to be printed through the network or directly from a print-requesting terminal or the image reading device connected to the network; and
a print cancel instruction unit that instructs cancellation of a current job being processed from an operation panel of the printing device, printing thereof being currently controlled by the print controller, and the image reading device comprises:
a job holding information acquisition unit that polls the printing device to see if the printing device will accept the print job and obtains job holding information indicating a state of the print job reserved in the queue from the printing device based on input to an operation panel of the image reading device;
a print request controller that reads original image data from an original and describes the read original image data in a page description language to request printing to the printing device;
a processing reserving unit that reserves a print request processing by the print request controller until the print job reserved in the queue runs out when it is judged according to the job holding information obtained by the job holding information acquisition unit that the print job is reserved in the queue, the print job reserved in the queue has not yet been selected for printing; and
a cancel instruction unit that allows the image reading device to cancel the print job prior to transmission to the printing device, based on a printer state acquisition request acquired from the printing device,
wherein the operation panel of the image reading device and the operation panel of the printing device are distinct.

2. The printing system according to claim 1, wherein:
the print request controller comprises:
an original reading unit that reads original image data from the original;
a copy print job generation unit that describes the original image data read by the original reading unit in a page description language to generate a copy print job; and
a copy print job requesting unit that requests printing by transmitting the copy print job generated by the copy print job generation unit to the printing device, and
the processing reserving unit reserves a reading processing of original image data by the original reading unit until the print job reserved in the queue runs out when it is judged according to the job holding information obtained by the job holding information acquisition unit that the print job is reserved in the queue.

3. The printing system according to claim 1, wherein:
the print request controller comprises:
an original reading unit that reads original image data from the original;
a copy print job generation unit that describes the original image data read by the original reading unit in a page description language to generate a copy print job; and
a copy print job requesting unit that requests printing by transmitting the copy print job generated by the copy print job generation unit to the printing device, and
the processing reserving unit reserves generation processing of the copy print job by the copy print job generation unit until the print job reserved in the queue runs out when it is judged according to the job holding information obtained by the job holding information acquisition unit that the print job is reserved in the queue.

4. The printing system according to claim 1, wherein:
the print request controller comprises:
an original reading unit that reads original image data from the original;
a copy print job generation unit that describes the original image data read by the original reading unit in a page description language to generate a copy print job; and
a copy print job requesting unit that requests printing by transmitting the copy print job generated by the copy print job generation unit to the printing device, and
the processing reserving unit reserves the print request by the copy print job requesting unit the print job reserved in the queue runs out when it is judged according to the job holding information obtained by the job holding information acquisition unit that the print job is reserved in the queue.

5. An image reading device which is connected directly or through a network to a printing device having a print controller that controls printing by sequentially reserving in a queue a print job and a print cancel instruction unit that instructs cancellation of a current job being processed from an operation panel of the printing device, printing thereof being currently controlled by the print controller, comprising:
a job holding information acquisition unit that polls the printing device to see if the printing device will accept the print job and obtains job holding information indicating a state of the print job reserved in the queue from the printing device based on input to an operation panel of the image reading device;
a print request controller that reads original image data from an original and describes the read original image data in a page description language to request printing to the printing device;
a processing reserving unit that reserves a print request processing by the print request controller until the print job reserved in the queue runs out when it is judged according to the job holding information obtained by the job holding information acquisition unit that the print job is reserved in the queue, the job reserved in the queue has not yet been selected for printing; and
a cancel instruction that allows the image reading device to cancel the print job prior to transmission to the printing device, based on a printer state acquisition request acquired from the printing device,
wherein the operation panel of the image reading device and the operation panel of the printing device are distinct.

6. A controlling method for an image reading device which is connected directly or through a network to a printing device having a print controller that controls printing by sequentially reserving in a queue a print job and a print cancel instruction unit that instructs cancellation of a current job being processed from an operation panel of the printing device, printing thereof being currently controlled by the print controller, and which describes the original image data read from an original in a page description language to perform print request processing to the printing device, comprising:

polling the printing device to see if the printing device will accept the print job;

obtaining job holding information indicating a state of the print job reserved in the queue from the printing device, based on input to an operation panel of the image reading device;

reserving the print request processing until the print job reserved in the queue runs out when it is judged according to the job holding information obtained from the printing device that the print job is reserved in the queue, the print job reserved in the queue has not yet been selected for printing; and allowing the image reading device to cancel the print job prior to transmission to the printing device, based on a printer state acquisition request acquired from the printing device, wherein the operation panel of the image reading device and the operation panel of the printing device are distinct.

\* \* \* \* \*